Figure 1:
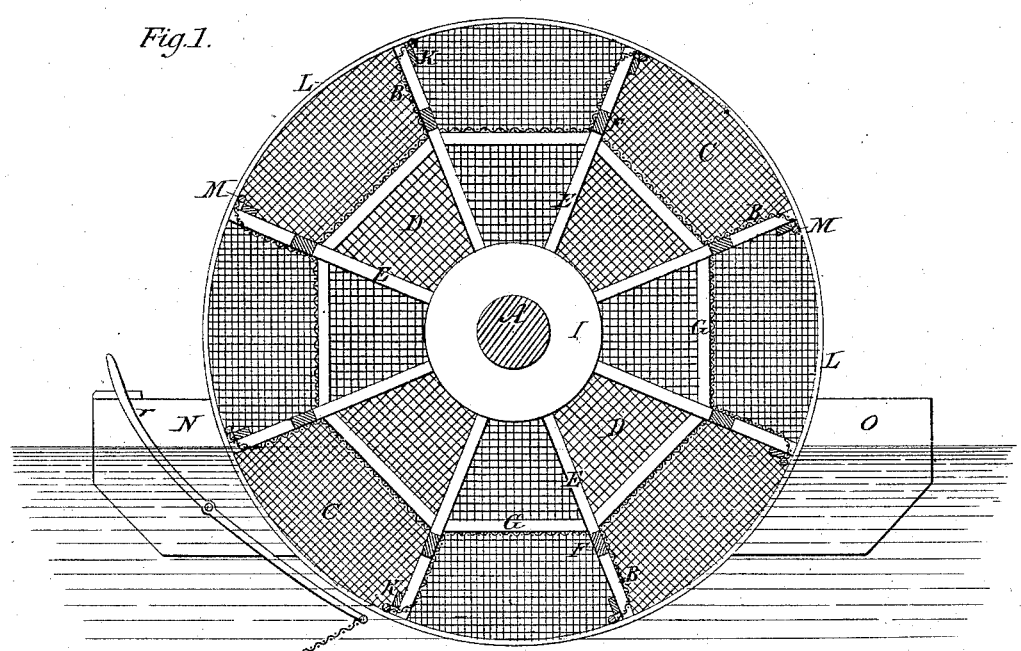

(No Model.)  2 Sheets—Sheet 1.

B. W. CLARK.
ROTARY FISH NET.

No. 314,565.  Patented Mar. 31, 1885.

Witnesses.  Inventor.
Benjamin W. Clark.

(No Model.) 2 Sheets—Sheet 2.

B. W. CLARK.
ROTARY FISH NET.

No. 314,565. Patented Mar. 31, 1885.

Witnesses.
J. P. Town
W. B. Chaffee

Inventor.
Benjamin W. Clark
per Edw. W. Donn
Atty.

UNITED STATES PATENT OFFICE.

BENJAMIN W. CLARK, OF HERNDON, VIRGINIA.

ROTARY FISH-NET.

SPECIFICATION forming part of Letters Patent No. 314,565, dated March 31, 1885.

Application filed March 31, 1884. (No model.)

*To all whom it may concern:*

Be it known that I, BENJAMIN W. CLARK, a citizen of the United States, residing at Herndon, in the county of Fairfax and State of Virginia, have invented certain new and useful Improvements in Rotary Dipping-Nets; and I do hereby declare the following to be a full, clear, and exact description of the invention, such as will enable others skilled in the art to which it appertains to make and use the same.

My invention relates to that class of fishing devices known as "dip-nets," to be used preferably above tide-water or at the junction of tide and rapidly falling water. The dip-net in common use is operated by hand-power by a movement down stream, which movement is repeated over and over again, the operator depending upon blind chance to catch the fish rising toward the head of the river or stream to spawn. These devices consist of loose baggy nets, secured by their edges over circular bows, the latter being secured firmly to long poles, which are held by the operators. The labor required in operating such a simple device, and the uncertainty of catching a considerable number of fish, renders it very desirable that some device should be brought into use which would be automatic, or nearly so, in its operation, and capable of catching and lifting a large number in a given time.

My invention consists of a rotary dipping-net adapted to be moved preferably by the current of a stream of water provided with buckets formed between radiating partitions and flanking-disks, the same being journaled between boats properly secured, all of which will be fully set forth herein.

The device is composed of a number of arms, thoroughly braced, radiating from a shaft provided with journals at its ends, which rest in suitable journal-bearings fixed in the lighters or boats. These wings, which are covered with netting, are flanked by two disks, also covered with netting, which fit snugly against said wings. Said wings, disks, and certain V-shaped chutes form a wheel comprising a series of buckets or cells to hold and discharge the fish taken at opposite sides into the said scows or boats which form the base or supporting portion of the rotary dipping-net.

The boats upon which the device is supported are preferably flat-bottomed for obvious reasons, and they have their longitudinal walls next to the wheel slotted to receive the shaft of the device as it is raised or lowered to suit circumstances. These boats are secured together so that their inner sides will set closely to the disk of the wheel, so that the fish caught may be discharged automatically as the said wheel rotates. The boats are to be provided with vertical ways, tongued or grooved, and adapted to receive the tongues or grooves of movable journal-bearings, which are to be adjusted vertically to accommodate the wheel to the depth of the water being fished. The rotary dipping-wheel is to be operated under favorable circumstances by the downstream movement of the water; but under less favorable circumstances it may be operated by hand-power from one of the boats by one or more cranks.

Figure 2:
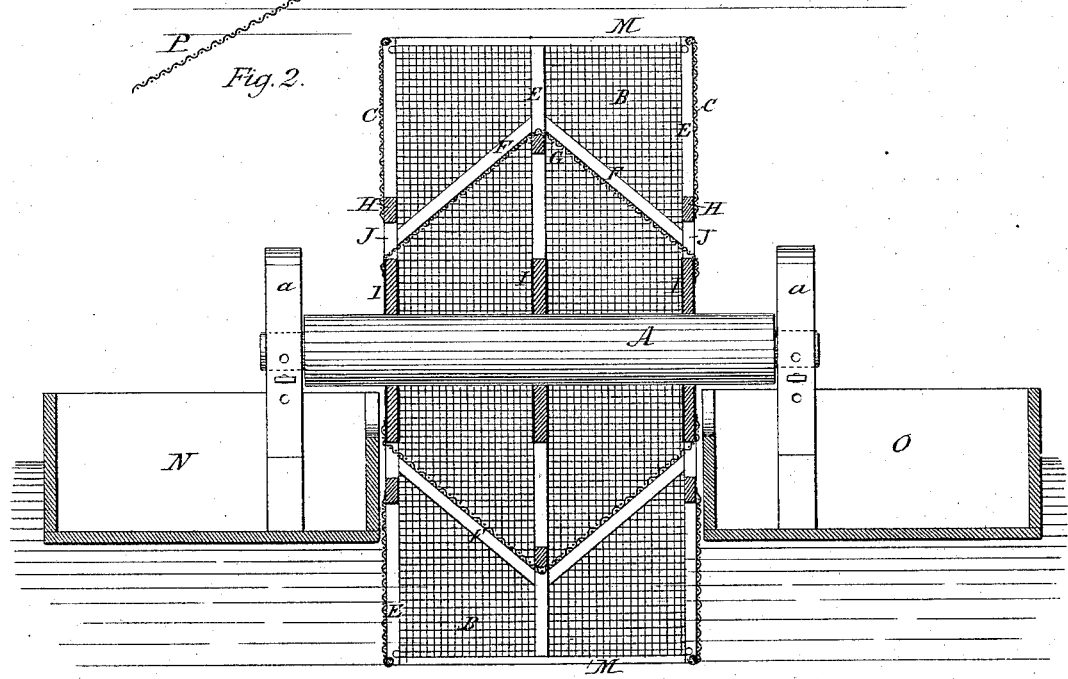
Figure 3:
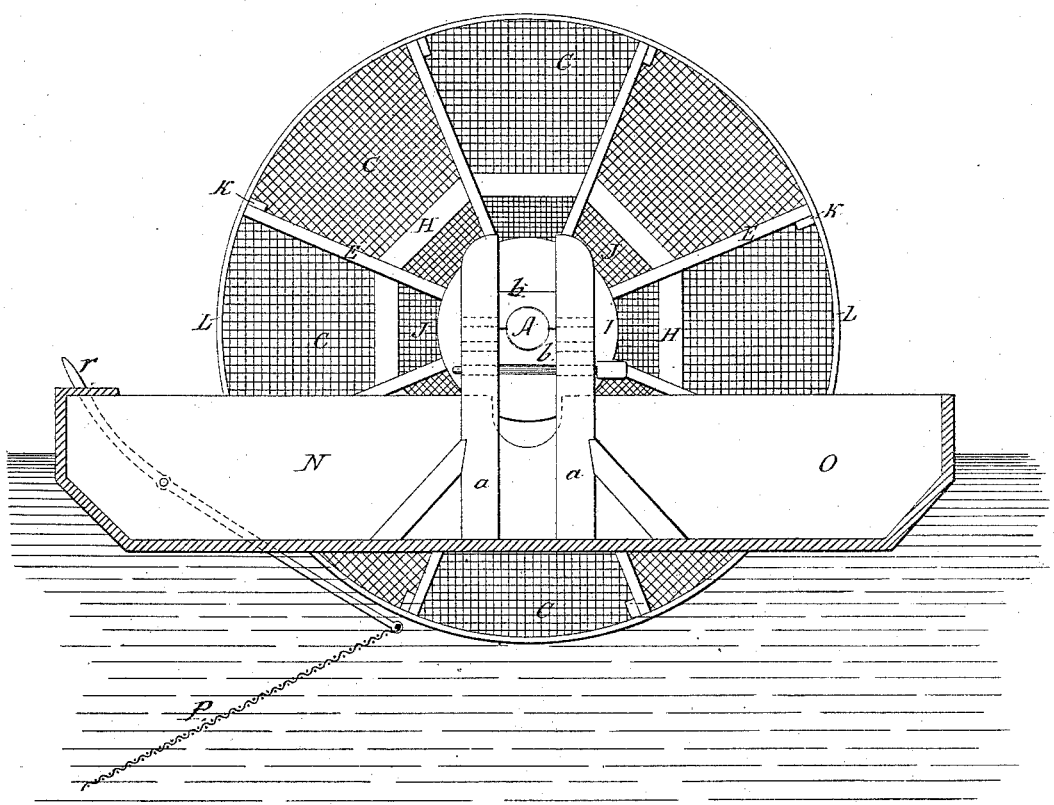
Figure 4:

In my drawings, Figure 1 is a longitudinal section of the rotary net and boats. Fig. 2 is a transverse section of the same. Fig. 3 is a section through one boat, showing the wheel in elevation; Fig. 4, sectional detail of journal-box.

Similar reference-letters indicate like parts in all of the figures.

Referring to the drawings, A is the shaft forming the axis of the rotary dipping-net. From this shaft extend radially three sets of arms, E, the number of each set corresponding with the number of wings to be employed. These arms are braced by beams G K H, the first, G, as shown, being for the middle set, those of K being for connection of the three sets or arms together, and the third, H, forming the outside braces to the outer arms, E, and serving at the same time as the upper walls for the several discharge-openings of the chutes. The middle and outside arms of the wheel are connected by V-shaped braces F. On either side of the several sets of radiating arms are fixed disks of metal I, which encircle the shaft A, being firmly fixed thereto to assist in bracing the wheel.

D are the chutes, formed of suitable netting material—wire-netting being preferred— which is carefully secured between the disks C, ridge-braces G, and V-braces F. The outside arms, E, of the wheel are connected and held to even spacing by a rod or band, L, which is braced laterally by means of rods M. The disks C are formed of netting material spread between the rods M and outside braces, H. Said disks serve as guards to prevent the escape of the fish laterally before being discharged through the chute-openings. The disks C and wings B form the walls of the several cells or buckets, which have their discharge-openings J formed by the outside radiating arms, the braces H, and the periphery of the outside disks, I. It may be observed that the rods M, which connect the bands L, are placed a little in advance of the outer braces, K, which connect the arms laterally, so that the netting, when stretched between the outer radiating arms, the V-shaped braces, the said braces K, and the connecting-rods M, forms guards to the several wings at their outer edges to prevent the fish from breaking or jumping back before the wings are sufficiently elevated to prevent such a possibility. The boats N O are of the ordinary square-built construction, such as are usually called "scows." Their side walls are preferably vertical, and when in position with the rotary dipping-net the inner side walls are close to the flanking-disks C. These inner sides of the boats are cut away somewhat to allow the shaft A of the wheel to sink down when the water being fished is of unusual depth. Standards $a\ a$, provided with tongues or grooves on their inner vertical edges, are fixed to the bottom of the boats and thoroughly braced thereto. Said standards extend upward from the bottoms of the boats above the height of the sides of the same. Movable journal-bearings $b$ for the shaft A, having grooves or tongues corresponding with the grooves or tongues of the standards, are adapted to move vertically, and by simple devices—such as pins and holes provided for them in the said standards, or by the well-known elevating-screw device—may be adjusted and held firmly to place at different heights, suitable to the diameter of the wheel and the depth of the water.

In connection with my rotary dipping-wheel I propose to use an apron, P, which will be anchored or weighted to the bottom downstream some distance from the boats and reaching upstream quite close under the wheel. This attachment is intended as a means for directing the rising fish toward the wings of the net and preventing them from passing under the same should they stand a distance from the bottom of the water. In order that this apron may be adjusted to different depths under the wheel, I employ two levers, $r$, pivoted to the inner sides of the boats with one end of their arms extending down attached to the end of said apron upstream, and the upper arms of said levers extending above the boats' sides within easy reach of the attendant. By means of these levers it will be readily seen that the upper end of the apron may be raised or lowered to suit different depths of water when the wheel has been raised or lowered to suit the same. The boats, when in position against the rotary dipping-wheel, are thoroughly braced together and anchored so that the fishing may go on uninterruptedly without special attendance. The wheel while moving either by the action of the water or by other means will by means of its wings, one of which will be constantly presented to the upwardly-moving fish, lift them when within reach and carry them over the shaft and discharge them on opposite sides into the boats without loss.

The shaft A at its ends may be provided with ordinary cranks; or, if necessary, gear-wheels may be employed in connection therewith to facilitate the movement of the wheel.

I propose, if it may be found desirable, to provide to the shaft and standards the ordinary and well-known pawl-and-ratchet device to prevent any back movement of the wheel should it at any time become overloaded at the taking parts of the wings by a heavy run of fish.

I do not claim, broadly, a rotary dipping-net provided with buckets and deflecting-planes to form discharge-chutes, as I am aware that such a claim would not be tenable in view of patents cited as references by an official communication in this case.

I also disclaim, broadly, the use of the directing-apron, as the state of the art at this time would not justify such a claim.

Having thus described my invention, what I claim as new, and desire to secure by Letters Patent, is—

1. A rotary dipping-net having buckets formed between partitions which radiate from the axis of the shaft which forms the center of motion to said wheel and sides formed of flanking-disks, the outer edges of which are concentric to the axis of said rotary net, substantially as and for the purpose set forth.

2. The rotary dipping-net, substantially as described, constructed with buckets formed from netting disks and radiating wings or partitions, the latter cupping inward at their free ends to form barriers to the back movement of the fish, in combination with the double deflecting-chutes which form the bottoms of said buckets, all arranged as specified.

3. The combination, with the rotary dipping-net formed as described, of the apron P, the adjusting-lever $r$, and supporting-boats N O, all arranged as and for the purpose set forth.

In testimony whereof I affix my signature in presence of two witnesses.

BENJAMIN W. CLARK.

Witnesses:
J. ALF. HAYWARD,
J. C. NICHOLS.